United States Patent

Maruyama et al.

Patent Number: 5,340,599
Date of Patent: Aug. 23, 1994

[54] METHOD OF MANUFACTURING THREE-DIMENSIONALLY FORMED FOODS

[75] Inventors: Toshirou Maruyama; Nobuyuki Tsubuki; Sakae Sakaniwa; Isao Yamaura; Kazuo Minegishi, all of Ooizumimachi, Japan

[73] Assignee: Ajinomoto Co., Inc., Tokyo, Japan

[21] Appl. No.: 39,420

[22] PCT Filed: Sep. 9, 1992

[86] PCT No.: PCT/JP92/01145
§ 371 Date: Jul. 9, 1993
§ 102(e) Date: Jul. 9, 1993

[87] PCT Pub. No.: WO93/04601
PCT Pub. Date: Mar. 18, 1993

[30] Foreign Application Priority Data
Sep. 12, 1991 [JP] Japan .................. 3-233420

[51] Int. Cl.⁵ .................................. A23P 1/00
[52] U.S. Cl. .................................. 426/512; 425/107
[58] Field of Search .............. 426/512, 506, 274, 289, 426/307; 425/107

[56] References Cited

U.S. PATENT DOCUMENTS

| | | | |
|---|---|---|---|
| 4,999,206 | 3/1991 | Lortz | 426/512 |
| 5,146,844 | 9/1992 | Dubowik et al. | 426/512 |

FOREIGN PATENT DOCUMENTS 2-55591  4/1990  Japan .

Primary Examiner—George Yeung
Attorney, Agent, or Firm—Oblon, Spivak, McClelland, Maier & Neustadt

[57] ABSTRACT

In a method of manufacturing three-dimensionally formed foods which comprises the step of continuously processing food material into a three-dimensional form by using a drum-type forming machine in which the forming surface of the forming blocks is release treated, the method comprises the steps of forming the food material by filling it into the forming blocks, and separating the formed food material (formed products) from the drum surface by jetting compressed air thereto. The method comprises the further step of spraying water, steam or hot water, spreading grain powder, or applying edible oil or fat, onto the forming blocks prior to filling the food material into the forming blocks. The method permits the continuous mass production of three-dimensionally formed foods with stable quality.

2 Claims, 3 Drawing Sheets

METHOD OF MANUFACTURING THREE-DIMENSIONALLY FORMED FOODS

TECHNICAL FIELD

The present invention relates to a method of manufacturing three-dimensionally formed foods.

BACKGROUND ART

Manufacturing of three-dimensionally formed foods having an uneven surface has been performed by a press method or by putting a decoration on a surface of a food once formed into a plate. These methods, however, have low productivity and are not suitable for continuous mass production.

On the other hand, a method using a drum type forming machine has been known as a method of permitting continuous mass production. In this method, formed foods extruded out of the molds, i.e., the forming blocks are separated from the forming machine by means of extendedly disposed piano wires and cut belts. Consequently, every separated food results in the form of a plate due to a piano wire, even if the forming block is formed to give an uneven surface. It is therefore impossible to manufacture three-dimensionally formed foods having an uneven surface with the use of such a drum type forming machine.

Nowadays, there is a great demand for foods in a wide variety of forms, attributable to the diversification of the needs from consumers; therefore, a technology is much expected to be developed which allows continuous mass production of three-dimensionally formed foods to be realizable in various forms with stable quality.

DISCLOSURE OF THE INVENTION

The present invention is to solve such problems, and to provide a method of continuously mass-producing three-dimensionally formed foods with stable quality.

More particularly, the invention is to provide a method of manufacturing three-dimensionally formed foods with the use of a drum-type forming machine.

Having strived to solve these problems, the present inventors have come to find that when food materials are continuously processed into a three-dimensional form using a drum-type forming machine with forming blocks whose forming surface is release treated, the occurrence rate of defectively formed products can be unexpectedly reduced by separating the food material formed with the forming blocks (formed products) from the surface of the drum by jetting compressed air thereto; and that the occurrence rate of defectively formed products can be also reduced by prespraying water, steam or hot water, prespreading grain powder or preapplying edible oil or fat, to the forming surface of the forming blocks, depending on the kind of the food material, in addition to separating the formed products in such a manner as mentioned above, prior to filling the food material therein, whereby three-dimensionally formed foods can be continuously manufactured with stable quality; and they have completed the present invention based on the above findings.

Thus, the present invention relates to (a) a method of manufacturing three-dimensionally formed foods comprising the step of continuously processing food material into a three-dimensional form by means of a drum-type forming machine with forming blocks whose forming surface is release treated, the method comprising the steps of forming the food material by filling it into the respective forming blocks, and separating the formed food material (formed product) from the drum surface by jetting compressed air thereto; and (b). The manufacturing method comprises the further steps of, prior to filling the foodmaterial into the forming blocks, spraying water, steam or hot water, spreading grain powder, or applying edible oil or fat to the forming surface of the forming blocks.

DESCRIPTION OF THE INVENTION

The present invention will now be described in more detail, as follows.

As a drum-type forming machine to be used in the manufacturing method of this invention in respect of which the forming surface of its forming blocks is release treated can be utilized a conventionally known drum-type forming machine in which the forming surface of its forming blocks is release treated, without being subjected to any specific restrictions, as far as it can attain the objects of the present invention.

In connection with the drum-type forming machine, explanation will be made referring to FIG. 1. It includes a rotating drum-type forming machine body (1) including forming blocks having a hopper for food material to be formed (i.e., to be processed into a three-dimensional form) (2) and a belt conveyor (3) for conveying formed products as its principal parts.

Figure 1:
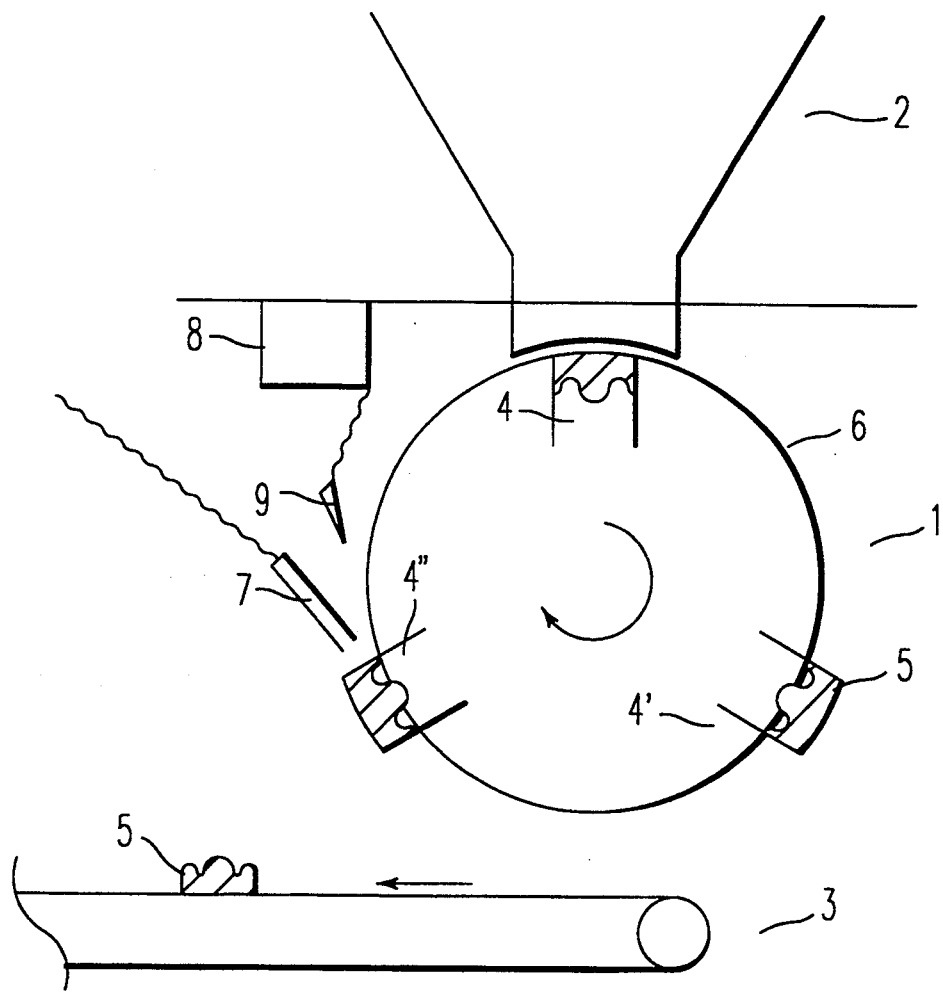
FIGS. 1 and 3 illustrate outlines of the method of manufacturing three-dimensionally formed foods by means of a drum-type forming machine.

The drum-type forming machine body is provided with more than two forming blocks (not all of the forming blocks are shown in FIG. 1), and their forming surfaces are raised or lowered with the rotation of the drum. The movement of the forming blocks will be described referring to a specific block (4) as follows; First, this forming block, when its forming surface is lowered to the limit, receives food material from the food material hopper and the is filled material therein. With the rotation of the drum, the bottom surface of the forming block (forming surface) is raised (4' position) to extrude the food material filled therein and formed (the formed product), and the forming surface is then raised to the limit (4" position). The formed product (5) is then separated from (the surface (6) of the drum to be transferred onto a belt conveyor. With a further rotation of the drum, the forming block, when its forming surface is lowered to the limit (4 position), receive food material again and goes into the following cycle of its movement.

Figure 2A:
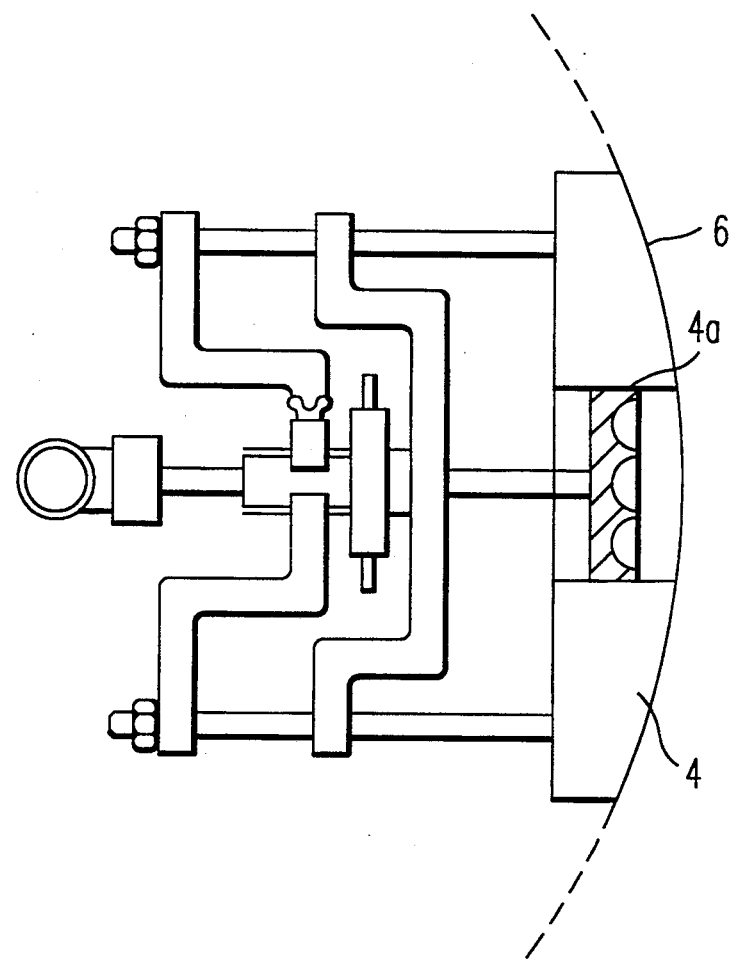
FIGS. 2(a) and 2(b) illustrate a release treated forming block.

In FIG. 2(a), a forming block (4) is shown with an example of the mechanism for raising and lowering its bottom surface.

Figure 2B:
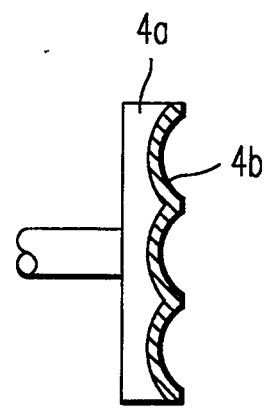

FIG. 2(b) is to illustrate a release treatment on the forming surface of a forming block.

The forming surface of the bottom part (4a) of the forming block is in a shape so as to give the formed product a spherical or any other shape, or an uneven surface and/or a patterned surface by blanking. The release treatment of the forming surface means a treatment to make the formed products easily releasable from the forming blocks. For that purpose, the forming surfaces may be coated with teflon, ceramic, silicon, or the like, regardless of the kind, but the most preferred one is a ceramic treatment. The thickness of the coating and the method of coating are not particularly limited. In the case of a teflon treatment, for example, only coating with fluoroplastic as solid membrane lubricant will suffice, while the method of coating, the thickness of the coating, and the like are not particularly defined. In FIG. 2, 4b denotes a release treated surface layer.

Food materials to be processed into a certain form by the method of manufacturing three-dimensionally formed foods according to the present invention include meats of animals, birds and whales, fishes and shellfishes, eggs, grains, corms and the processed foods thereof, and they are not limited to specific kinds, specific thermal or non-thermal treatment, and specific methods of processing. Three-dimensional foods according to the present invention designate foods having a certain form other than flat, i.e., those of a spherical shape or those having an uneven surface and/or a patterned surface by blanking. Examples of such forms include human and animal faces, plants, fruits, flowers and comic characters.

Separating the food material formed into an above-described form from an above-described food material by means of the forming blocks (formed products) from (the surface of) the drum according to a conventional method results in a high occurrence rate of defectively formed products.

According to the present invention, the occurrence rate of defectively formed products is unexpectedly decreased by performing the separation of formed products from the drum surface by -jetting compressed air thereto. This is illustrated in FIG. 1. In the figure, a compressed air nozzle (7) is disposed in such a direction that the formed products can be easily separated. According to the present invention, compressed air, for example, air compressed by means of a compressor, is jetted from a nozzle having a rectangular or circular cross-section.

In order to decrease the occurrence rate of defectively formed products, it can be additionally employed to spray water, steam or hot water, to spread grain powder, or to apply edible oil or fat, to the forming blocks, prior to filling food material therein.

Figure 3:
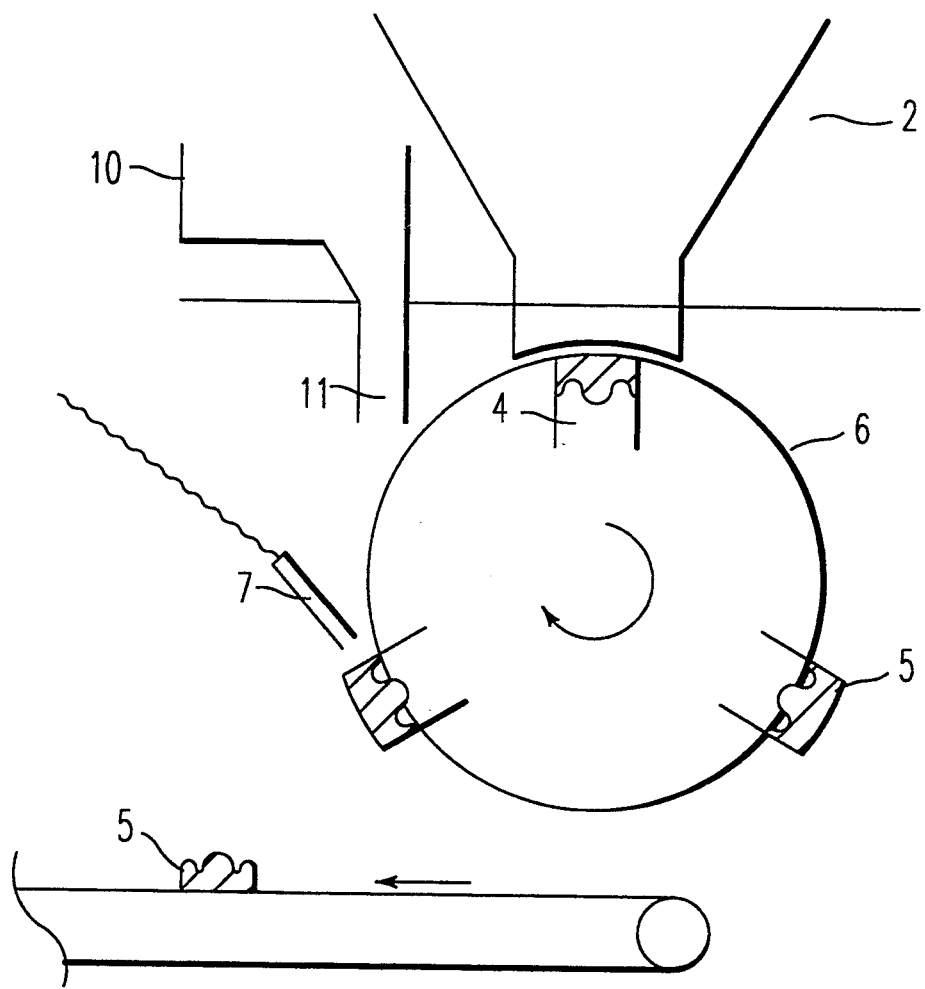

In FIG. 1, a case of spraying water is shown as an example. The water contained in a water tank(8) is sprayed through a water spraying nozzle (9). In FIG. 3, a case of spreading grain powder (11) is shown as an example, instead of spraying water as shown in FIG. 1. The grain powder contained in a grain powder hopper (10) is spread through the hopper (10) at a desired time.

Apparently, it is after separating the formed products but prior to filling food material for the following cycle that water, steam or hot water is sprayed, grain powder is spreaded, or edible oil or fat is applied, to the forming blocks, considering the objects of these operations.

The grain powder to be used according to the present invention may be any powder which can be utilized as so-called dusting powder, such as wheat flour, rice powder and various kinds of starch. And, edible oil or fat may be vegetable oil, such as salad oil, and animal fat, and these oils and fats may contain food additives, such as detergent.

The food material formed according to the manufacturing method of the present invention (formed products) may, if solidification of their shape is required, be solidified in their form by drying, heating such as deep frying in heated oil, or in any other appropriate manners. Moreover, when food materials are required to be cooked as they are raw and therefore the formed products thereof cannot be eaten as they are, it is of course possible, if appropriate, to make the heating for solidifying their shape function as the heating for cooking. In the case of deep frying, the formed products can be deep fried by throwing them directly into heated oil, not by way of a belt conveyor.

BEST MODE FOR CARRYING OUT THE INVENTION

The present invention will be further described by way of the following test examples (examples and comparative examples).

TEST EXAMPLE 1

Using mashed potatoes as a food materials to be formed, formability, i.e., probability of being processed into a desired three-dimensional form, was determined by means of a drum-type forming machine having forming blocks made of ordinary stainless steel or those blocks surface-treated with teflon, silicon or ceramic. Separation of the formed products from the forming blocks was by natural dropping, while the shapes of the formed products were solidified by deep frying in heated oil.

The results are shown in Table 1.

TABLE 1

| Forming blocks | No. of defective products/No. of total formed products | Deficiency rate (%) |
| --- | --- | --- |
| Made of stainless steel | 192/200 | 99.0 |
| Treated with teflon | 149/200 | 74.5 |
| Treated with silicon | 151/200 | 75.5 |
| Treated with ceramic | 61/200 | 30.5 |

As shown in Table 1, in the case of using the forming blocks made of stainless steel, the formed products did not successfully drop onto the belt conveyor due to insufficient separation, and almost no completely formed products were obtained. In the case of using the forming blocks treated with teflon or silicon, as many as about 75% of the total formed products were defectively formed. In the case of using forming blocks treated with ceramic, the occurrence rate of defectively formed products as noted above was considerably reduced to about 30%; however, it needs to be further reduced.

TEST EXAMPLE 2

TEST EXAMPLE 1 was repeated so far as forming blocks made of stainless steel and those blocks treated with ceramic, but separation of the formed products was carried out by means of compressed air. The results are shown in Table 2.

TABLE 2

| Separation | No. of defective products/No. of total formed products | Deficiency rate (%) |
| --- | --- | --- |
| Forming blocks made of stainless steel + compressed air | 195/200 | 97.5 |
| Forming blocks treated with ceramic + compressed air | 1/200 | 0.5 |

As shown in Table 2, for the forming blocks made of stainless steel, most of the formed products were partially defective products or defective ones due to unsuccessful dropping onto the conveyor belt (defectively formed products); however, for the forming blocks treated with ceramic, the occurrence rate of partially defective products and defective ones due to unsuccessful dropping onto the conveyor belt was reduced to approximately 0%.

TEST EXAMPLE 3

Using meat material, formability was determined in the above-mentioned manner. The shapes of the formed products were solidified by heating with heated stream, which functioned as heating for cooking.

The results are shown in Table 3.

TABLE 3

| Separation | No. of defective products/No. of total formed products | Deficiency rate (%) |
| --- | --- | --- |
| Forming blocks made of stainless steel + compressed air | 198/200 | 99.0 |
| Forming blocks treated with ceramic + compressed air | 160/200 | 80.0 |
| Forming blocks made of stainless steel + compressed air + water | 160/200 | 80.0 |
| Forming blocks treated with ceramic + compressed air + water | 2/200 | 1.0 |

As shown in Table 3, in the bases of using the forming blocks made of stainless steel and the forming blocks treated with ceramic respectively in combination with compressed air, for the forming blocks made of stainless steel, almost all formed products were partially defective ones and defective ones due to unsuccessful dropping onto a belt conveyor, while even for the forming blocks treated with ceramic, the occurrence rate of the defectively formed products was approximately 80%. Moreover, in the cases of using the forming blocks made of stainless steel and the forming blocks treated with ceramic respectively in combination with compressed air and water spraying, the occurrence rate of the defectively formed products was 80% for the forming blocks made of stainless steel, while the rate was virtually 0% for the forming blocks treated with ceramic. Even with meat material which is difficult to be separated from a forming block, if water spraying is used in addition to employing a forming block treated with ceramic in combination with compressed air, it is thus possible to attain nearly 100% of formability.

TEST EXAMPLE 4

As shown in Table 3, starch is applied through the grain powder hopper 10 onto a forming block 4 treated with teflon, or salad oil is spreaded over the surface of the forming block 4. After filling food material to be formed through the food material hopper 2 in the forming block 4 equipped in the drum-type forming machine body 1, the drum is rotated. When the forming block 4 passes the lowest point of the drum-type forming machine body 1, the formed food material (formed product) 5 starts to be extruded out of the forming block 4. Compressed air is continuously or intermittently jetted through the nozzle 7 to the formed material to separate the formed product 5 from the forming block 4. The separated formed product 5 is then conveyed by means of the conveyor belt 3.

Mashed potatoes were thus formed.

In the each of respective cases for separating shown in Table 4, 200 formed products were manufactured. The formed mashed potatoes were solidified in their shape by deep frying in heated oil.

The results are shown in Table 4.

TABLE 4

| Separation | No. of defective products/No. of total formed products | Deficiency rate (%) |
| --- | --- | --- |
| Forming blocks made of stainless steel | 200/200 | 100 |
| Forming blocks made of stainless steel + starch | 132/200 | 66 |
| Forming blocks treated with teflon + starch | 0/200 | 0 |
| Forming blocks made of stainless steel + salad oil | 122/200 | 61 |
| Forming blocks treated with teflon + salad oil | 0/200 | 0 |

As shown in Table 4, in the test according to the method of the present invention, no defective products (defectively formed products) were found among the formed products.

INDUSTRIAL APPLICABILITY

According to the present invention, three-dimensionally formed foods such as those having an uneven surface can be continuously mass produced without producing defective products (defectively formed products) by means of a drum-type forming machine.

We claim:

1. In a method of manufacturing three-dimensionally formed foods which comprises the step of continuously processing food material into a three-dimensional form by means of a drum-type forming machine with forming blocks whose forming surface is release treated, the improvement comprises the steps of: forming the food material by filing the food material into the forming blocks; extruding the formed food material from the forming blocks thereby raising the formed food material above a surface of the drum-type forming machine; and separating the formed food material from the surface of the drum-type forming machine by jetting compressed air thereto.

2. The method according to claim 1, further comprising the step of: spraying water, steam or hot water, spreading grain powder, or applying edible oil or fat onto the forming surface of the forming blocks, prior to filling said food material in said forming blocks.

* * * * *